United States Patent [19]
Evoy

[11] Patent Number: 6,062,480
[45] Date of Patent: May 16, 2000

[54] HOT DOCKING SYSTEM AND METHODS FOR DETECTING AND MANAGING HOT DOCKING OF BUS CARDS

[75] Inventor: David Ross Evoy, Tempe, Ariz.

[73] Assignee: VLSI Technologies, Inc., San Jose, Calif.

[21] Appl. No.: 09/119,081

[22] Filed: Jul. 20, 1998

[51] Int. Cl.[7] .................................................. G06K 19/06
[52] U.S. Cl. ..................... 235/492; 235/472.01; 235/441; 235/487; 235/440; 235/451; 902/22; 902/24; 902/29; 324/538; 710/101; 710/103; 365/226
[58] Field of Search ............................... 235/472.01, 492, 235/441, 486, 487, 451, 449, 450, 379, 380, 382, 440; 710/101, 103; 365/226; 324/538; 902/22, 24, 29

[56] References Cited

U.S. PATENT DOCUMENTS

| | | | |
|---|---|---|---|
| 4,747,783 | 5/1988 | Bellamy et al. | 439/59 |
| 5,184,025 | 2/1993 | McCurry et al. | 307/66 |
| 5,268,592 | 12/1993 | Bellamy et al. | 307/43 |
| 5,365,221 | 11/1994 | Fennell et al. | 340/636 |
| 5,430,681 | 7/1995 | Sugawara et al. | 365/222 |
| 5,475,271 | 12/1995 | Shibasaki et al. | 307/31 |
| 5,532,945 | 7/1996 | Robinson | 364/707 |
| 5,555,510 | 9/1996 | Verseput et al. | 364/514 R |
| 5,568,610 | 10/1996 | Brown | 395/185.01 |
| 5,589,719 | 12/1996 | Fiset | 307/131 |
| 5,619,660 | 4/1997 | Scheer et al. | 395/282 |
| 5,636,347 | 6/1997 | Muchnick et al. | 395/283 |
| 5,745,426 | 4/1998 | Sekiyama | 365/226 |
| 5,805,473 | 9/1998 | Hadderman | 364/707 |
| 5,815,426 | 9/1998 | Jigour et al. | 365/51 |
| 5,818,251 | 10/1998 | Intrater | 324/765 |
| 5,841,724 | 11/1998 | Ebel et al. | 365/226 |

*Primary Examiner*—Thien M. Le
*Assistant Examiner*—Daniel S. Felten

[57] ABSTRACT

A hot docking system and method for managing and detecting hot docking of bus cards. The hot docking system detects the load impedance at the power pins of the bus connector to determine whether a card has been inserted. When insertion is detected, bus activity on the connector is ceased until the card is completely inserted which is indicated by signals present on card detect pins which are mechanically shorter that the bus signal pins and thereby provide this insertion signal after all other connections are complete. The power supply pins are mechanically longer than the bus signal pins thereby providing an early indication that a card has been inserted. On removal of the card, the card detect pins disconnect before the bus signal pins or the power supply pins, signaling the system to halt bus activity but maintain power on the connector until the card is completely removed.

15 Claims, 4 Drawing Sheets

HOT DOCKING SYSTEM AND METHODS FOR DETECTING AND MANAGING HOT DOCKING OF BUS CARDS

BACKGROUND OF THE INVENTION

1. Field of the Invention

This invention relates generally to computer expansion buses and, more specifically, to PCMCIA (Personal Computer Memory Card International Association) bus equipped computers which require insertion and removal of expansion cards to be accomplished while the computer is in operation.

2. Description of the Prior Art

Buses for notebook and portable computers are needed which allow the simple connection and disconnection of peripheral equipment to ease portability and reduce power consumption. One such bus is the PCMCIA bus. Using this bus, peripheral and memory expansion cards (hereinafter cards) can be inserted and removed during system operation without disturbing the operation of the system. Software and BIOS support enable detection and initialization of the peripheral or expansion card so that the peripheral or expansion card can be used without shutting down or restarting the system. Insertion of a card while the system is operational is known as hot docking of a card.

PCMCIA buses have traditionally provided for insertion and removal of cards during system operation by electrically isolating the primary bus signals of the computer from the bus signals present on the on card connectors. This is usually accomplished by buffers disposed between the system primary bus and each peripheral bus connector and separate buffers are used for each bus connector and one for other non-removable system resources that require buffers such as a Flash ROM and BIOS ROM (hereinafter ROM). The separate buffers are required so that on insertion or removal of a card, the operation of other cards or ROM is not disturbed and their states are not corrupted. The partial bus connection, which occurs on insertion or removal of a card, causes the components on the card to enter undesired states and in these states, they may drive their signals onto the bus, causing improper operation of the system. The separate buffers traditionally provided between the bus connectors and other peripherals and system components ensure that this improper operational state does not affect system operation or operation of other peripherals by isolating the signals on that card from the rest of the system. When a card is inserted, card detect signals, which are located on pins which are physically shorter than the bus signal pins, allow the system to produce a card detected signal which is used to enable the bus buffer.

Also in the prior art, the card detect pins on the PCMCIA connector have been used to direct the PCMCIA controller to disable power to the PCMCIA connector. This enhances the possibility of data corruption, and therefore the need for separate buffers, as the supply voltage on the PCMCIA card may drop out of operating range before the bus signal pins are disconnected.

The need for these buffers presents several disadvantages. They consume area on the peripheral bus controllers and they increase the overall pin count since the bus connections, as well as the ROM and FLASH connections, require separate pins. Thus, they raise the cost and complexity of computers that use these buses.

SUMMARY OF THE INVENTION

In accordance with one embodiment of the present invention, it is an object of the present invention to provide a circuit for detecting the insertion of a peripheral card on a peripheral bus and a method of operation of the bus such that data corruption does not occur in the system or other cards upon the insertion of a card while the system is operating without utilizing a separate buffer for each connector.

In accordance with one embodiment of the present invention, it is an object of the present invention to provide a means for allowing insertion and removal of cards in an operating computer system without requiring the bus to be buffered at each card connector.

It is another object of the present invention to provide a circuit for detecting the insertion of a peripheral card on a peripheral bus and a method of operation of the bus such that data corruption does not occur in the system or other cards upon the insertion of a card while the system is operating without utilizing a separate buffer for each connector.

It is another object of the present invention to provide a means for removal of a card on a peripheral bus such that data corruption does not occur in the system or other cards without using a separate buffer for each connector.

It is another object of the present invention to enable the use of just one buffer that can be shared with system BIOS ROM and FLASH ROM to isolate the peripheral connectors from the primary system bus.

It is another object of the present invention to maintain power to the card while the bus signal pins are connected, preventing the card from corrupting the state of other cards or devices on the bus.

BRIEF DESCRIPTION OF THE PREFERRED EMBODIMENT

In accordance with one embodiment of the invention, PCMCIA bus connector power supply pins are monitored to detect when a card has been inserted. When a card is not inserted in the connector, the power supply pin is in an open circuit state. When a PCMCIA card is inserted in the slot, the card loads the power supply connector pin with an impedance that is lower than the open circuit state. This terminal characteristic change can be detected and used to provide an indication that a card is being inserted. Since the power supply pins are longer than the bus signal pins, this detection method can provide an early warning to the system to disable bus cycles on the PCMCIA bus. The PCMCIA connector also has card detect signal pins, shorter than the bus signal pins, which are normally used to indicate to the system that a card has been inserted. The present invention uses these pins to indicate to the system that card insertion is complete and bus cycles to the PCMCIA bus can be initiated. Upon removal of the PCMCIA card, these pins will return to their open circuit state allowing the system to detect card removal before the bus signal pins have disconnected. This allows the system to disable bus signals to the PCMCIA connector for a time to allow disconnection to be completed. In the present invention, these pins no longer direct the system to remove power from the PCMCIA slot. The removal of power is delayed until sufficient time to remove the card has elapsed. This prevents undesired states from being produced by the logic on the PCMCIA card while the bus signal pins are still connected. If the power supply is disabled, the signal pins can enter undesired states and corrupt other PCMCIA cards or ROM or FLASH ROM.

Since insertion and removal of PCMCIA cards has been prevented from disrupting the bus by these techniques, a common buffer can now be used for all PCMCIA connectors as well as the FLASH ROM and BIOS ROM in the system. This reduces component count and pin counts required on system control logic.

The foregoing and other objects, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
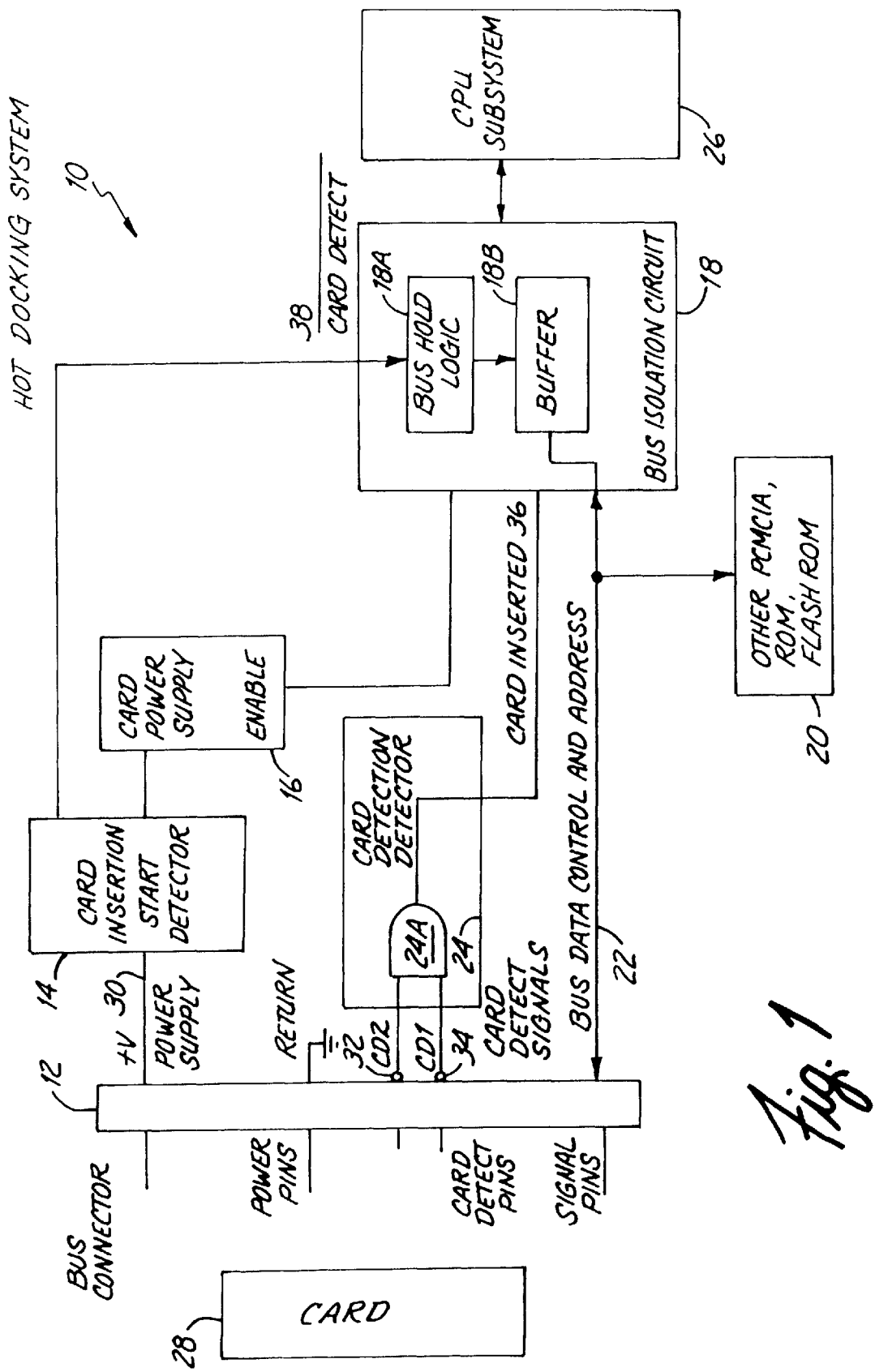
FIG. 1 is a simplified electrical diagram of the hot docking system.
Figure 6:
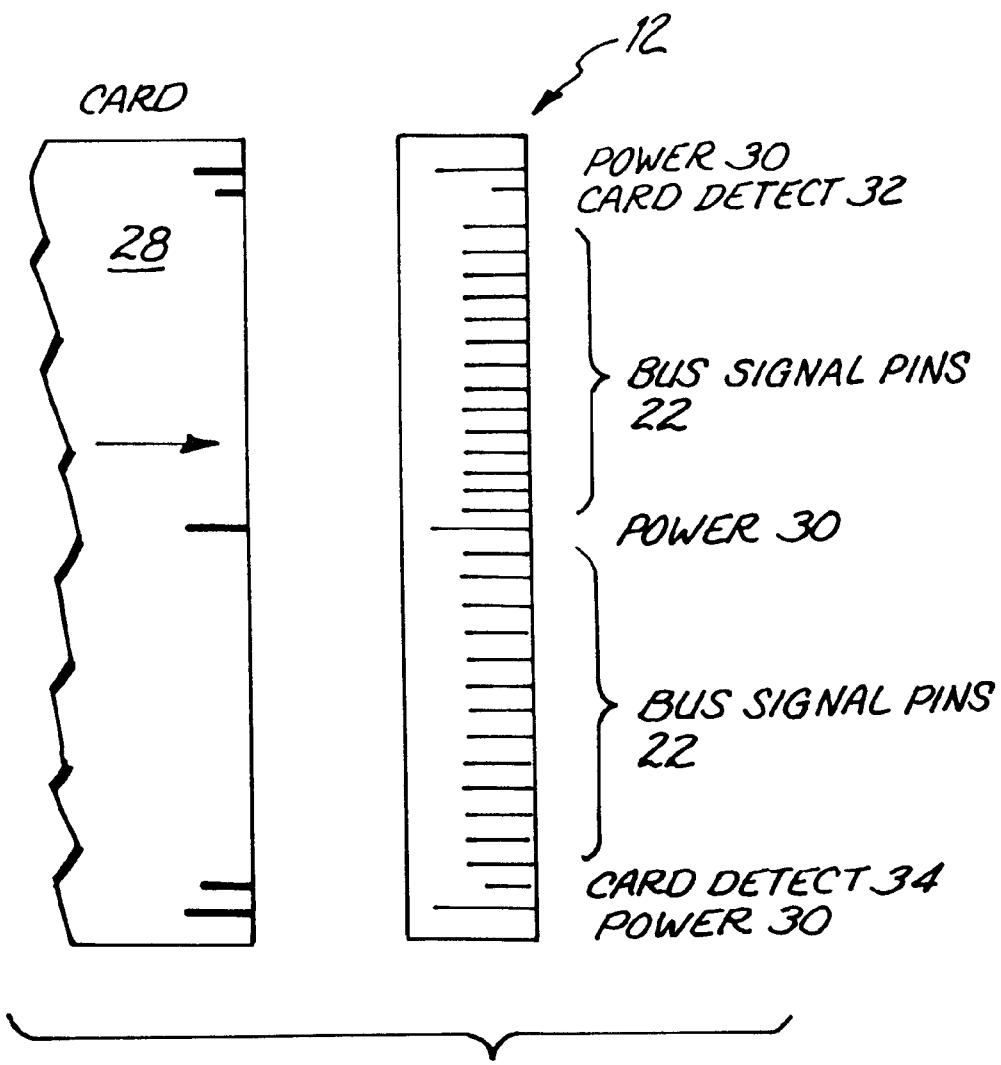
FIG. 6 is a simplified mechanical illustration of the bus connector pin arrangement.

Referring to FIG. 1, a hot docking system 10 for a PCMCIA connector 12 is shown. A card insertion start detector 14 provides a signal in advance of the connection of the bus connector 12 signals to the card 28. This is accomplished in one embodiment of this invention by the design of the PCMCIA physical connector 12, where the power pins 30 are mechanically longer than the bus 22 signal pins (FIG. 6). In one embodiment of the present invention, the card insertion start detector 14 is connected to the power supply pin 30 of the bus connector 28. The card insertion start detector 14 is coupled to a card detect input 38 of the bus hold logic 18A within the bus control 18 which also contains a buffer 18B. The bus hold logic 18A creates the signals or states needed to indicate to the CPU subsystem 26 that cycles should be ceased on the bus 22 until the card detect input 38 is restored to its inactive state. This bus hold logic 18A is a standard logic element in peripheral bus controllers. It is used to freeze the state of the control lines and disable data and address lines to the bus 22. The buffer 18B isolates the CPU subsystem 26 system bus from the bus connector 12 and the bus 22 which is coupled to other PCMCIA devices and ROM and FLASH ROM 20. Signals that are shared include address and data. Control signals that select and write to the FLASH ROM 20 are separate signals that are held inactive during the hold state. This prevents the unknown state of the signal pins at connector 12 from corrupting other PCMCIA cards or FLASH or ROM 20 on the same bus 22 since the bus 22 will be in a hold state and power will be supplied to the inserted card 28 before the bus 22 signal pins are connected. The operation of the CPU subsystem 26 is isolated by buffer 18B and is unaffected by the state of the bus 22 at this time. When the card 28 is fully inserted, the card detect pins, connector 12 pins CD1 (card detect one) 32 and CD2 (card detect two) 34 are activated. The AND gate 24A within the card inserted detector 24 combines these signals so that when both are activated, a card inserted signal 36 is produced which is input to the bus isolation circuit 18. This card inserted signal 36 becomes active after the bus signals 22 are connected to the card 28, which is accomplished by means of the card detect pins 32 and 34 being mechanically shorter than the bus signal pins 22. When the card inserted signal 36 becomes active, the card power supply 16 is enabled by means of its control input. The card detect signal 38 to the bus hold logic 18A, indicating to the CPU subsystem 26 that bus 22 cycles can be resumed, is then deactivated.

Figure 3:
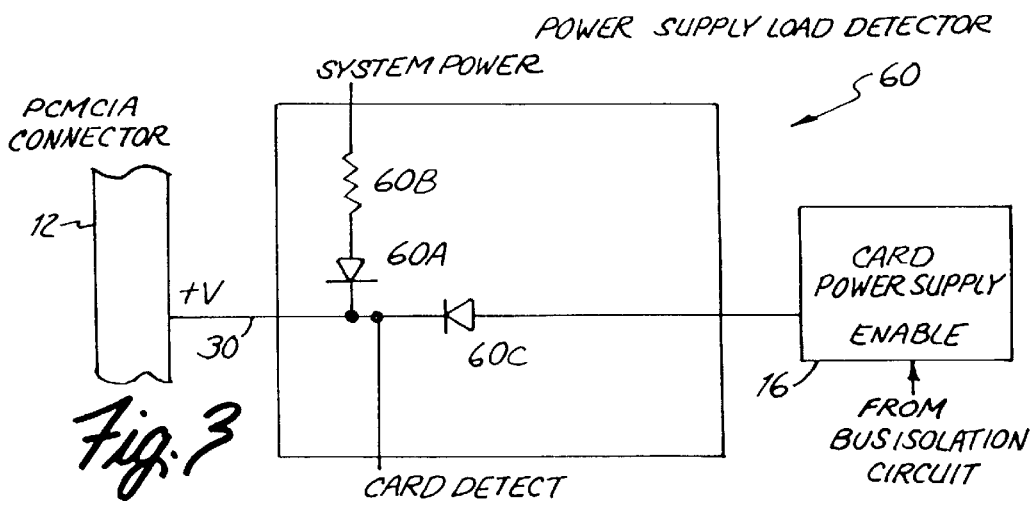
FIG. 3 is a simplified electrical diagram of the power supply load detector.

One implementation of a card insertion start detector 14 is a power supply load detector 60 (FIG. 3) that detects a change in impedance on the bus connector 12 power supply pin 30. By supplying a current limited voltage source to this pin 30 before a card is inserted, a drop in voltage can be detected at that power supply connector pin 30. This function could also be served by measuring the current flowing into the power supply pin 30 or other terminal characteristic, but this is not preferred since the present embodiment produces a logic level signal with few components. Referring to FIGS. 1 and 3, within the power supply load detector 60, diode 60A and resistor 60B provide a current limited voltage supply to the power supply pin 30 on the connector 12. Diode 60C provides that the card power supply 16 not load the power supply pin on the connector 12 while it is disabled. When a card 28 is inserted with the power supply 16 disabled, an impedance is presented at the power pin 30 which is low enough to cause the power pin 30 to drop to a logic low signal. When the power supply 16 is enabled it forward biases diode 60C in the power supply load detector 60 and powers the PCMCIA card 28.

Figure 2:
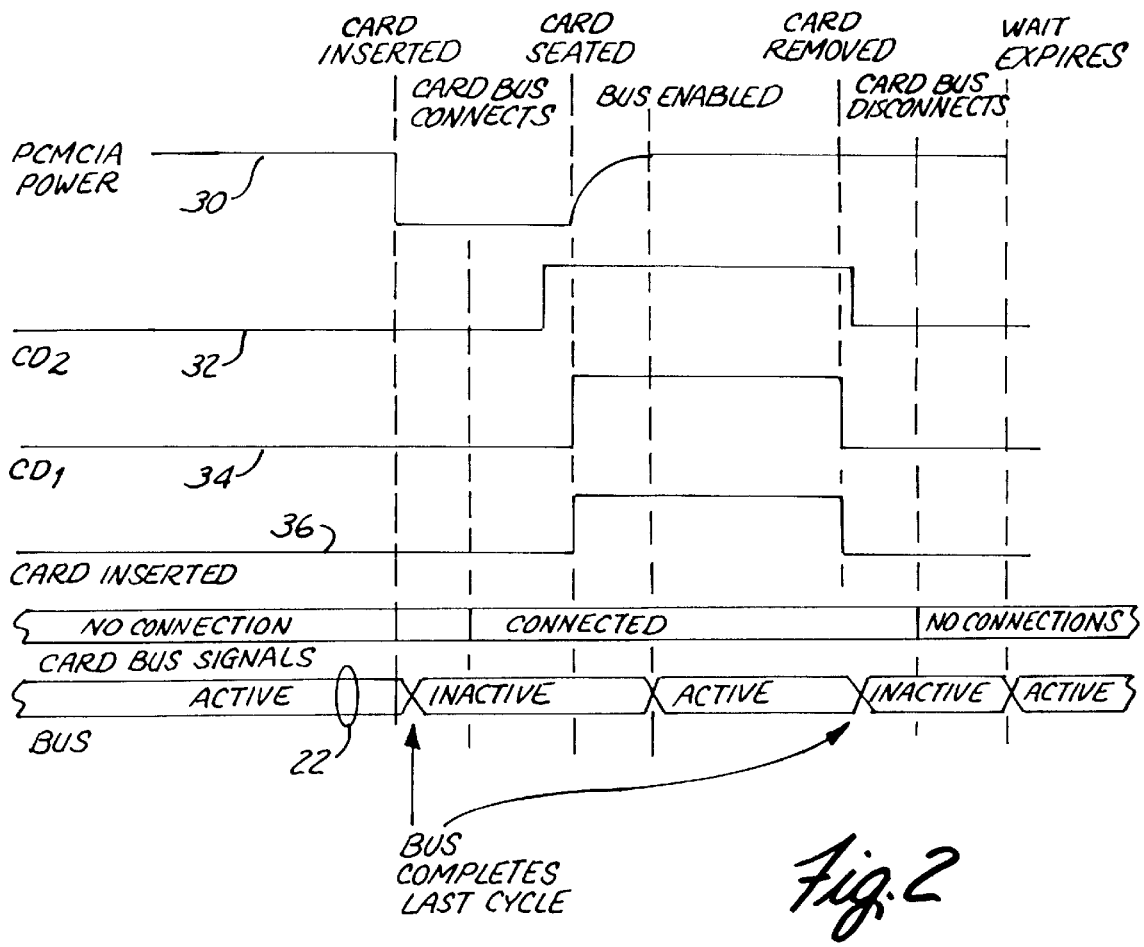
FIG. 2 is a timing diagram showing the control signals in the hot docking system.

FIG. 2 shows the relationships between signals in the hot docking system. The bus 22 is in an active state until the card 28 is inserted and the power pins 30 connect. The power supply pins 30 are at a logic high level as provided by the pull-up connection of the resistor 60B (FIG. 3) and diode 60A (FIG. 3) in the power supply load detector 60 (FIG. 3). When the card 28 (FIG. 1) is inserted, the power pins 30 connect and the voltage on the pin 30 drops to a logic low level. The bus 22 completes its last cycle and is then placed in a hold state with buffers 18B (FIG. 1) disabled. Then, the card bus signals 22 (FIG. 1) connect. When the card is fully seated, the card detect signals CD1 32 and CD2 34 connect and stabilize to their active states. The card power supply 16 (FIG. 1) is then enabled powering the circuits in the card 28 (FIG. 1). The system enables the buffers 18B (FIG. 1) and disables the bus hold circuit 18A (FIG. 1), placing the bus 22 (FIG. 1) in an operating state. When card removal has started, the card detect signals 32 and 34 return to their inactive state. The bus 22 completes its last cycle while the bus signals 22 are still connected and the buffer 18B (FIG. 1) is once again disabled and the bus hold circuit 18A (FIG. 1) activated. When the card bus 22 disconnects and after a wait time has elapsed, the bus 22 is returned to the active state by enabling the buffer 18B (FIG. 1) and disabling the bus hold circuit (18A FIG. 1).

An important consideration in the practice of the present invention is the timing of the bus isolation circuit 18 (FIG. 1) activation with respect to the physical insertion of card 28 (FIG. 1). In order for the present invention to achieve the desired result, the time required to disable activity on the bus 22 and drive the control lines of the bus 22 to a known state should disable access to resources on the bus 22. Upon card 28 insertion, the time between engagement of the first power pin 30 connected to the insertion detector and the engagement of the card detect signal pins 32 and 34 must be greater than the time required to disable activity on the bus 22. Upon card 28 removal, the time between disconnection of the first card detect signal pin 32 or 34 and disconnection of the last power pin 30 must also be less than the time required to disable activity on the bus 22.

Referring to FIG. 1, in order to prevent undesired states on bus 22 from affecting other cards 20, ROM 20 and the CPU subsystem 26, the bus isolation circuit 18 must be activated before the bus signals 22 connect to a card being inserted 28. In addition, the bus isolation circuit 18 must be activated before the bus signals 22 disconnect from a card 28 being removed. Referring to FIG. 6, the bus connector pin arrangement is shown. The bus power supply pins 30 are physically longer than the bus signal pins 22 which are again physically longer than the card detect pins 32 and 34. The PCMCIA specification calls for a power pin length of 0.197+/−0.004" and a bus signal pin length of 0.167+/−0.004". Taking the longest allowable length for the bus signal pins 22 and the shortest allowable length for the power pins 30 the minimum difference in pin length is 0.193"−0.171"=0.022". For a bus isolation circuit 18 (FIG. 1) which has a cycle time of 12 microseconds (which is typical for a PCMCIA peripheral bus) this distance and time correspond to a velocity of 153 feet per second. However, if the bus signals 22 can be disabled in only 2 microseconds, the velocity corresponds to 917 feet per second. Both of these velocities are high with comparison to normal insertion speeds, since the PCMCIA connectors have some positive friction locking associated with the pins on the connector 12. This will tend to reduce the speed of the card at the beginning of insertion, which is the critical time.

Figure 4:
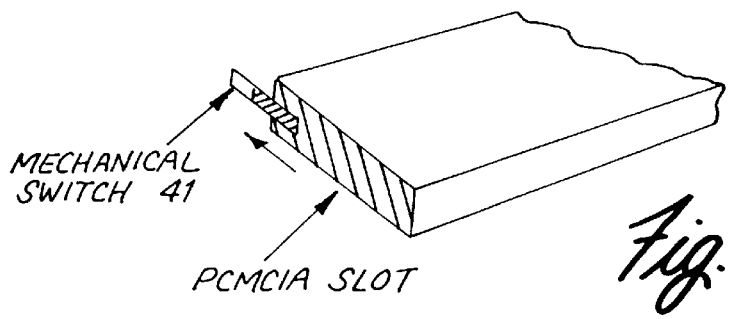
FIG. 4 is a simplified mechanical illustration of a mechanical switch arrangement to control a hot docking system.
Figure 5:
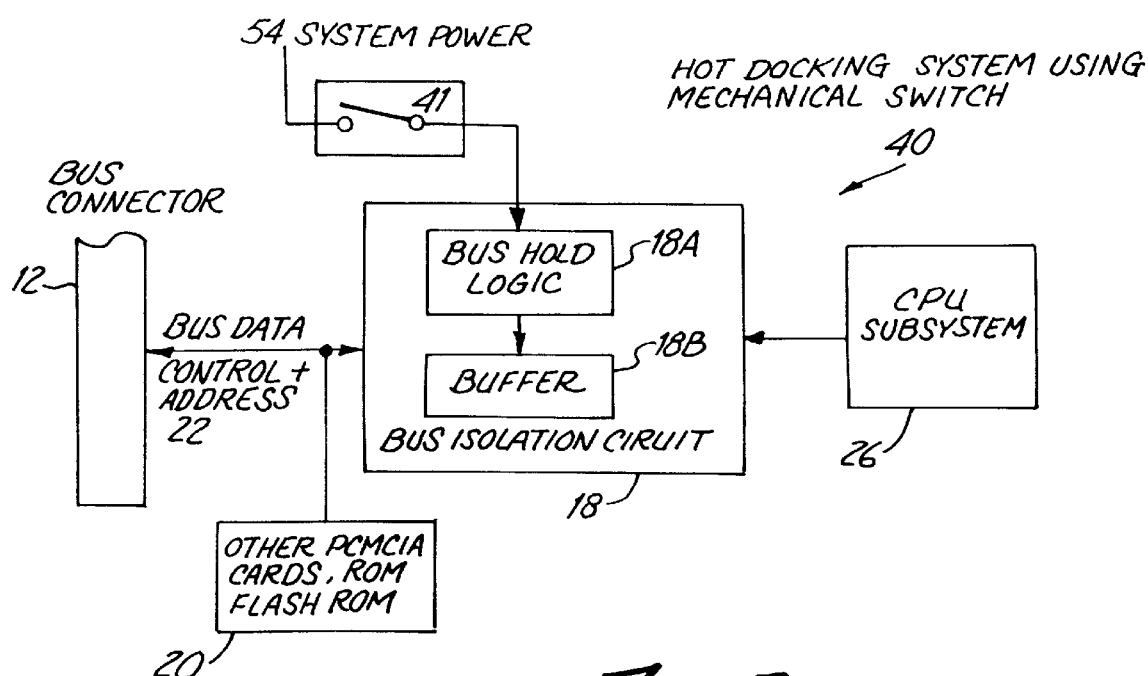
FIG. 5 is a simplified electrical diagram of a hot docking system using a mechanical switch.

An alternative implementation of a hot docking system utilizes a mechanical switch 41 disposed near the bus connector 12 as shown in FIG. 4. The switch 41 obstructs insertion of a card until it is moved such that it is no longer obstructing the card slot opening. FIG. 5 shows an electrical diagram of the hot docking system using a mechanical switch 40. When the switch 41 is in the non-obstructing position, the bus hold 18A is enabled and buffer 18B is disabled to prevent bus cycles from occurring on bus 22 and to isolate the CPU subsystem 26 from the bus 22. When the switch 41, is restored to its original position (FIG. 5), it will block removal of the card 28, disable the bus hold 18A and enable buffer 18B to allow operation of the bus 22. This prevents undesired states from occurring on the bus 22, since it will be impossible to insert or remove the card 28 while the bus 22 is in an operating state. The time required to operate the switch 41 and insert the card 28 is far in excess of the time required to place the bus 22 in an inactive state.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A hot docking system comprising:
a bus having a least one bus connector;
a card insertion start detector coupled to said bus for detecting that a bus card is being inserted in said at least one bus connector;
a bus isolation circuit coupled to said card insertion start detector for preventing activity on said bus for an insertion hold time period after said card insertion detector is activated; and
a card inserted detector adapted to determine an end of said insertion hold time period and to signal said bus isolation circuit and therein prevent activity for a release hold time period after said card inserted detector is deactivated.

2. A hot docking system in accordance with claim 1 wherein said bus isolation circuit is signaled to prevent activity for a release hold time period after said card removal detector is activated.

3. A hot docking system in accordance with claim 1 further comprising a card insertion end detector for determining an end of said insertion hold time period.

4. A hot docking system in accordance with claim 1 wherein said card insertion start detector is coupled to a card detect input of said bus isolation circuit for determining the start of said insertion hold time period.

5. A hot docking system in accordance with claim 1 wherein said card insertion start detector comprises a power supply load detector for determining that a power supply connection of a bus card has electrically coupled to a corresponding power supply connection on said bus.

6. A hot docking system in accordance with claim 4 wherein said card insertion start detector comprises a power supply load detector for determining that a power supply connection of a bus card has electrically coupled to a corresponding power supply connection on said bus.

7. A hot docking system in accordance with claim 6 wherein said power supply load detector comprises:
a first diode having a cathode and an anode;
a second diode having a cathode coupled to said cathode of said first diode and an anode coupled to a controllable card power supply having a card power supply output terminal; and
a resistor having a first terminal coupled to the anode of said first diode and a second terminal coupled to a power supply.

8. A hot docking system in accordance with claim 1 wherein said bus is a PCMCIA bus.

9. A hot docking system in accordance with claim 5 wherein said bus is a PCMCIA bus.

10. A hot docking system in accordance with claim 6 wherein said bus is a PCMCIA bus.

11. A hot docking system in accordance with claim 7 wherein said bus is a PCMCIA bus.

12. A hot docking system in accordance with claim 6 wherein said card inserted detector comprises an AND gate having a first input coupled to a card detect one signal from said bus which indicates insertion of said card in said at least one bus connector has been completed and a second input coupled to a card detect two signal from said bus which indicates insertion of said card in said at least one bus connector has been completed.

13. A card insertion detector useful for coupling signals on a bus between a processing arrangement and a bus card, the detector comprising a power supply load detector for determining that a power supply connection of the bus card has coupled to a corresponding power supply connection on the bus, the power supply load detector including
a first diode having a cathode and an anode;
a second diode having a cathode coupled to said cathode of said first diode and an anode coupled to a controllable card power supply having a card power supply output terminal; and
a resistor having a first terminal coupled to said anode of said first diode and a second terminal coupled to a power supply.

14. A method for allowing hot insertion of a peripheral card in a card connector comprising the steps of:
setting an electrical condition at a power pin at said card connector monitoring said electrical condition at said power pin;
detecting card insertion by detecting a change in said electrical condition;
placing a bus associated with said card connector into an isolated state during insertion;
supplying full power to said power pin;
detecting the end of card insertion; and after and in response to the step of detecting the end of card insertion, restoring said bus to its operative state by generating a signal that commands release of the bus from the isolated state.

15. The method of claim 14 further comprising the steps of:

detecting the start of removal of said peripheral card; and placing a bus associated with said card connector into a hold state during removal.

\* \* \* \* \*